United States Patent
Tsai

(10) Patent No.: US 6,424,303 B1
(45) Date of Patent: Jul. 23, 2002

(54) NOTEBOOK WITH A RETRACTABLE ANTENNA

(75) Inventor: Wen-Sung Tsai, Taipei (TW)

(73) Assignee: Chi Mei Optoelectronics Corporation, Tainan County (TW)

( * ) Notice: Subject to any disclaimer, the term of this patent is extended or adjusted under 35 U.S.C. 154(b) by 0 days.

(21) Appl. No.: 09/836,211

(22) Filed: Apr. 18, 2001

(51) Int. Cl.[7] .................................................. H04B 7/15
(52) U.S. Cl. ........................................ 343/702; 455/90
(58) Field of Search ............................ 343/702; 455/90, 455/11.1, 556, 557, 569, 575, 568, 572

(56) References Cited

U.S. PATENT DOCUMENTS 4,920,352 A * 4/1990 Martensson et al. ........ 343/702
5,905,457 A * 5/1999 Rashid ........................ 342/70
5,983,073 A * 11/1999 Ditzik ........................ 455/11.1

* cited by examiner

Primary Examiner—Don Wong
Assistant Examiner—James Clinger
(74) Attorney, Agent, or Firm—Winston Hsu

(57) ABSTRACT

A notebook with a retractable antenna installed on a housing. The notebook has a housing, a memory, a processor, a display panel, and an antenna. The memory is installed in the housing for storing programs and data. The processor is electrically connected to the memory for processing the programs and data. The display panel is installed on the housing for displaying picture images. The retractable antenna is installed in the housing for transmitting or receiving radio frequency signals.

5 Claims, 4 Drawing Sheets

NOTEBOOK WITH A RETRACTABLE ANTENNA

BACKGROUND OF THE INVENTION

1. Field of the Invention

The present invention relates to a notebook and, more specifically, to a notebook with a retractable antenna installed in a housing.

2. Description of the Prior Art

Notebooks are now commonly used for personal computing. Because they are small and light, notebooks are suitable to be taken out of the home or office for document processing. Because wireless transmission techniques are maturing, hard-wire connection with electric network lines is no longer needed to transmit electrical signals, and signals may be received or transmitted from anywhere in a wireless manner.

As wireless transmission techniques develop, antenna 112 design becomes important. Please refer to FIG. 1 and FIG. 2. FIG. 1 is a schematic diagram of a notebook 100 according to the prior art. FIG. 2 is a function block diagram of the notebook 100 in FIG. 1. The notebook 100 comprises a housing 102, a memory 104 installed in the housing 102 for storing programs 105 and data 106, a processor 108 electrically connected with the memory 104 for processing programs 105 and data 106, a display panel 110 installed in the housing 102 for displaying picture images, and an antenna 112. The antenna 112 is set on a motherboard inside the housing 102 of the notebook 100. Therefore, the antenna 112 often does not receive signals properly, due to a limited bandwidth.

SUMMARY OF THE INVENTION

It is therefore a primary objective of the present invention to provide a notebook with a retractable antenna, installed in the housing, that has a higher bandwidth.

It is another objective of the present invention to provide a notebook of which the status of the antenna can be known.

According to the claimed invention, a notebook comprises a housing, a memory installed in the housing for storing programs and data, a processor electrically connected to the memory for processing programs and data, a display panel installed in the housing for displaying picture images, a retractable antenna installed in the housing and an LED for signaling on and off of the antenna.

It is an advantage of the present invention that the antenna protrudes from the housing, when in use, so as to achieve higher bandwidths.

It is another advantage of the present invention that the LED can signal on and off of the antenna so that a user can know the status of the antenna.

These and other objectives and advantages of the present invention will no doubt become obvious to those of ordinary skill in the art after having read the detailed description of the preferred embodiment that is illustrated in the various figures and drawings.

BRIEF DESCRIPTION THE DRAWINGS

DETAILED DESCRIPTION OF THE PREFERRED EMBODIMENT

Figure 1:
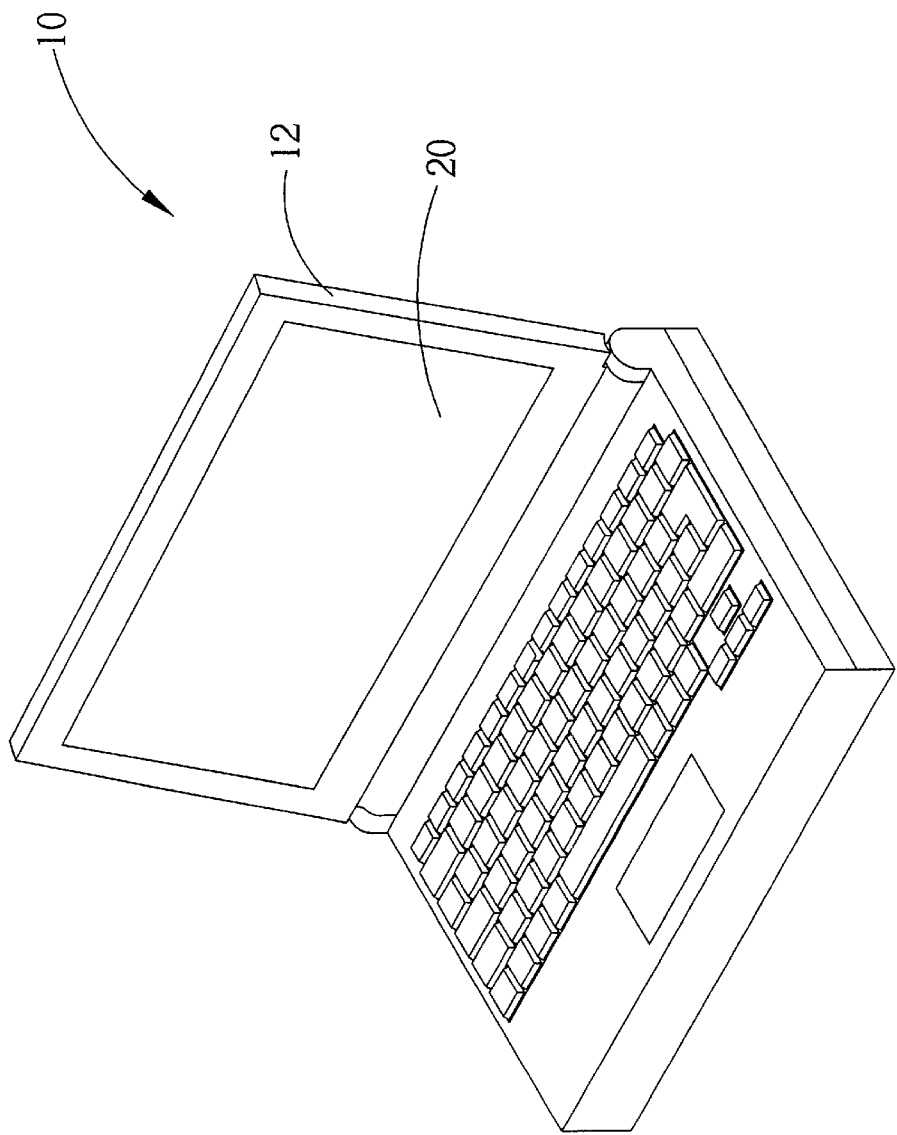
FIG. 1 is a schematic diagram of a prior art notebook.
Figure 2:
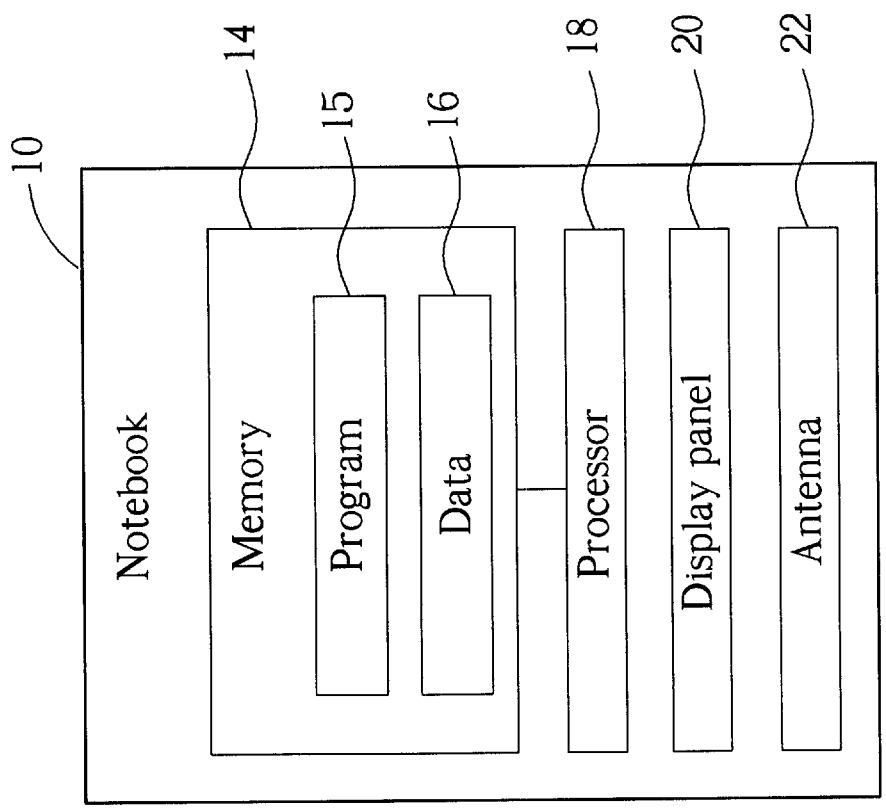
FIG. 2 is a function block diagram of the notebook in FIG. 1.
Figure 3:
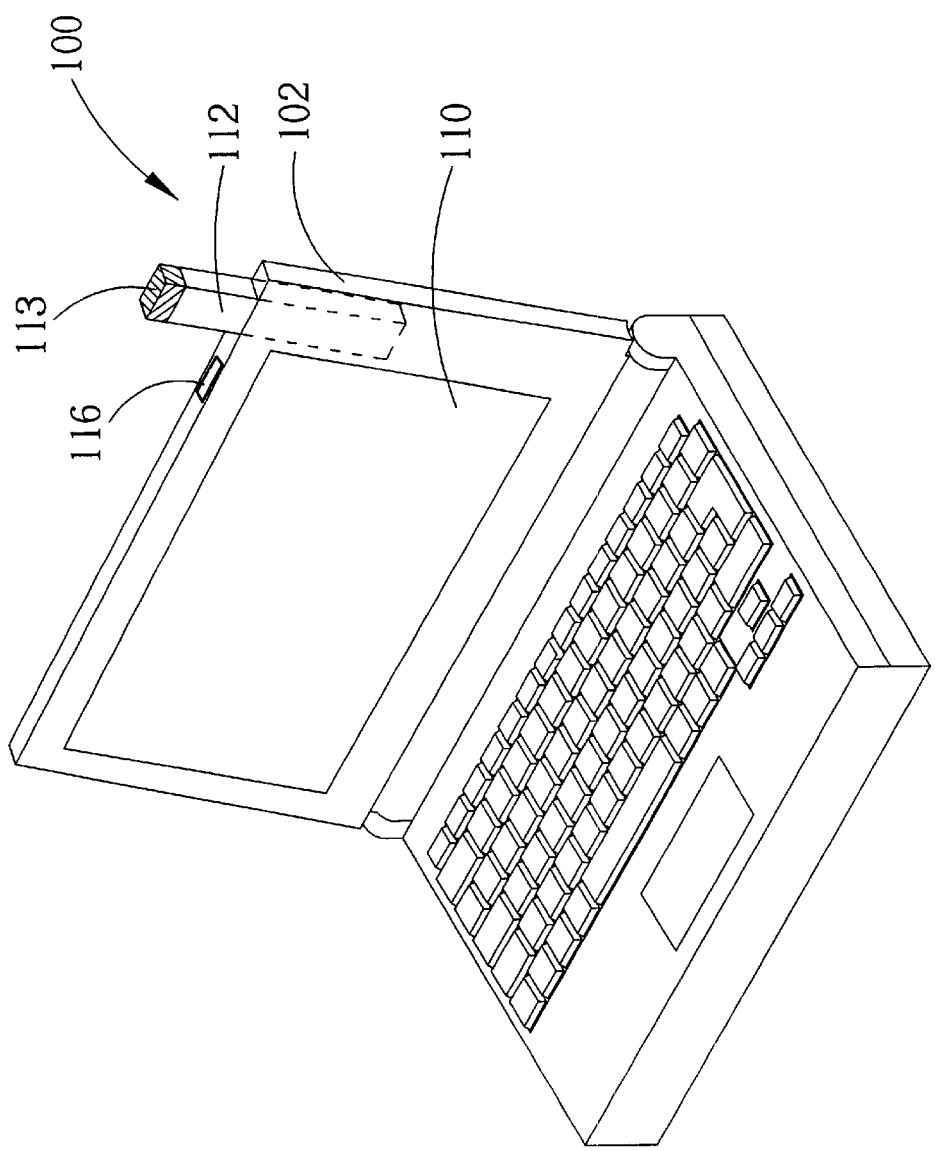
FIG. 3 is a schematic diagram of a notebook according to the present invention notebook.
Figure 4:
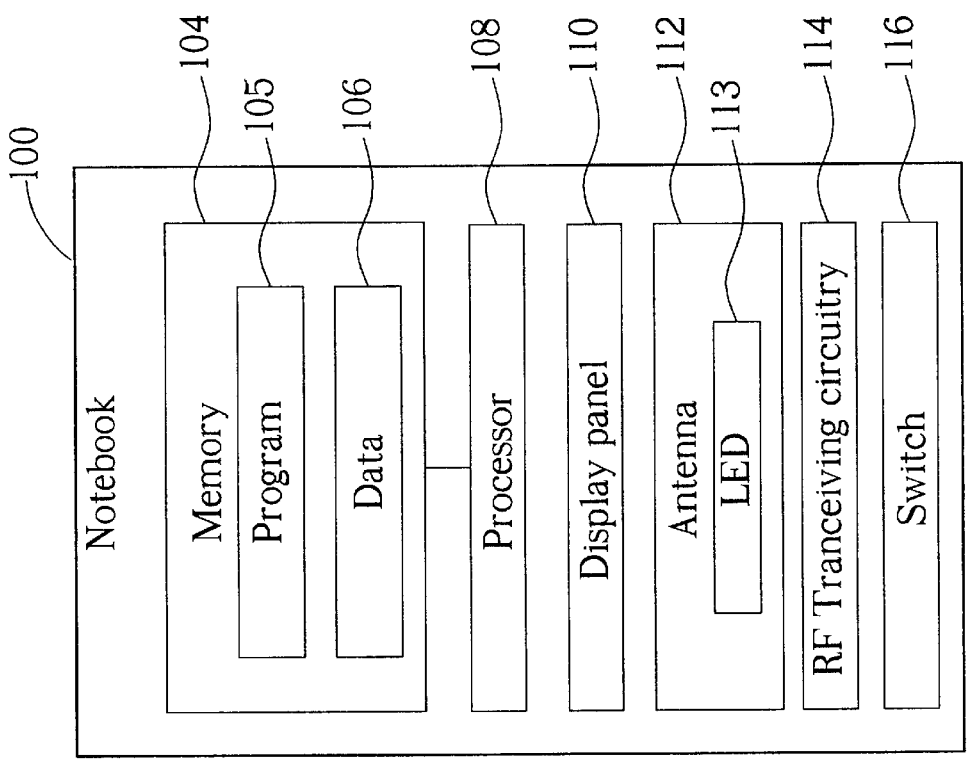
FIG. 4 is a function block diagram of the notebook in FIG. 3.

Please refer to FIG. 3 and FIG. 4. FIG. 3 is a schematic diagram of a notebook 100 according to the present invention. FIG. 4 is a function block diagram of the notebook 100 in FIG. 3. The notebook 100 comprises the housing 102, a memory 104, a processor 108, a display panel 110, and an antenna 112. The antenna 112 is installed on the housing 102 of the notebook 100 for receiving and transmitting wireless signals. The memory 104 is installed in the housing 102 for storing programs 105 and data 106. The processor 108 is electrically connected to the memory 104 for processing the programs 105 and data 106 in the memory 104. The display panel 110 is installed in the housing 102 to display picture images.

As shown in FIG. 4, the notebook 100 further comprises radio frequency (RF) tranceiving circuitry 114 for receiving RF signals and converting the received RF signals into baseband signals, and receiving baseband signals and converting the received baseband signals into RF signals.

As shown in FIG. 3, the antenna 112 of the notebook 100 is installed on the housing 102 in a retractable manner. The embodiment is processed in a pop-up style. When the notebook 100 needs to transmit signals with other systems in a wireless way, a user can push the pop-up antenna 112. The antenna 112 then flips out of the housing 102 and electrically connects the RF receiving and transmitting circuitry 114 to receive or transmit RF signals. If the user wants to discontinue wireless transmission, the user can push the antenna 112 again, and the antenna 112 will return to the housing 102. The antenna 112 will interrupt the electric connection with the RF tranceiving circuitry 114 to stop receiving or transmitting signals, canceling wireless transmission.

Furthermore, the present invention is also capable of moving the antenna 112 out in another way. The housing 102 of the notebook 100 could further comprises a start switch 116 to open and close the electric connection of the antenna 112 and the RF tranceiving circuitry 114. When the switch 116 is activated, the electric connection of the RF tranceiving circuitry 114 will conduct. When the switch 116 is closed, the electric connection of the antenna 112 and the RF tranceiving circuitry 114 will interrupt. The switch 114 can also move the antenna 112 out.

Users often ignore whether the environment will allow them to access wireless transmissions while using personal computers with wireless transmission functions. In some special environments, for example, in an airplane, especially when the airplane is taking off or loading, according to air safety regulations, passengers are not allowed to use computers for wireless transmission or receiving wireless signals. But, passengers are allowed to process or browse data in computers without wireless transmission signals. However, users often do not know whether computers are allowed to transmit wireless signals or not, and sometimes users violate rules prohibiting computers from transmitting wireless signals in forbidden environments. Or, users simply do not use computers and even give up the right of accessing or browsing data in computers. As shown in FIG. 3, the notebook 100 includes another switch 116 for forcing the start or close functions of the antenna 112. When the switch 116 is enabled, the user can control the antenna 112 by pushing or changing the switch 116. When the switch 116 is disabled, the user can not control the antenna 112 by pushing or changing the switch 116.

Additionally, the antenna 112 on the notebook 100 shown in FIG. 3 comprises another transparent structure, wherein a light emitter diode (LED) 113 is set for showing the use stage of the antenna 112. In this embodiment, when the antenna 112 is awaiting orders, the LED 113 will emit light. Furthermore, the transparent structure can be located in the ring of the antenna 112 or use a whole top portion of the antenna 112. The embodiment described is for a case of the whole top portion of the antenna 112 being used.

The antenna 112 shown in FIG. 3 is a long column, but the design of the antenna 112 could also be of circular or other shape. The display panel 110 shown in FIG. 3 is an LCD display panel.

Compared with the notebook of the prior art, the present invention positions the antenna 112 to a position outside of the housing 102, obtaining an improved ability to receive signals, due to a higher bandwidth. Additionally, the antenna 112 is retractable, so that it can retract into the housing 102 when not in use, thereby not occupying space outside of the notebook 100. The LED 113 on the antenna 112 can display the use stage of the antenna 112, so that the user is informed as to whether the antenna 110 of the notebook 100 is awaiting orders, transmitting, or receiving signals.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A notebook comprising:

a housing;

a memory installed in the housing for storing programs and data;

a processor electrically connected to the memory for processing the programs and data;

a display panel installed on the housing for displaying picture images;

a retractable antenna installed in the housing for trasmitting or receiving radio frequency signals;

a radio frequency transceiving circuitry for receiving RF signals and converting the received RF signals into baseband signals, and receiving baseband signals and converting the received baseband signals into RF signals; and a switch for enabling a user to control the rotatable antenna;

wherein when the switch is enabled, the user is capable of switching the antenna to electrically connect the retractable antenna with the RF transceiving circuitry and to electrically disconnect the retractable antenna from the RF transceiving circuitry; and when the switch is disabled, the user is unable to switch the antenna to electrically connect the retractable antenna with the RF transceiving circuitry and to electrically disconnect the retractable antenna from the RF transceiving circuitry.

2. The notebook of claim 1 wherein when the antenna extends out of the housing, the antenna is electrically connected with the RF transceiving circuitry; and when the antenna is retracted into the housing, the antenna is electrically disconnected from the RF transceiving circuitry.

3. The notebook of claim 1 wherein the antenna comprises an LED for signaling on and off of the antenna.

4. The notebook of claim 1 wherein the antenna is in a rectangular or cylindrical shape.

5. The notebook of claim 1 wherein the display panel is an LCD panel.

\* \* \* \* \*

UNITED STATES PATENT AND TRADEMARK OFFICE
CERTIFICATE OF CORRECTION

PATENT NO. : 6,424,303 B1
DATED : July 23, 2002
INVENTOR(S) : Tsai

It is certified that error appears in the above-identified patent and that said Letters Patent is hereby corrected as shown below:

<u>Title page,</u>
Item [73], Assignee: should read -- COMPAL ELECTRONICS INC., Taipei (TW) --

Signed and Sealed this

Third Day of February, 2004

JON W. DUDAS
*Acting Director of the United States Patent and Trademark Office*